(No Model.)
A. F. FOX.
FOLDABLE MUD GUARD.
No. 558,377. Patented Apr. 14, 1896.
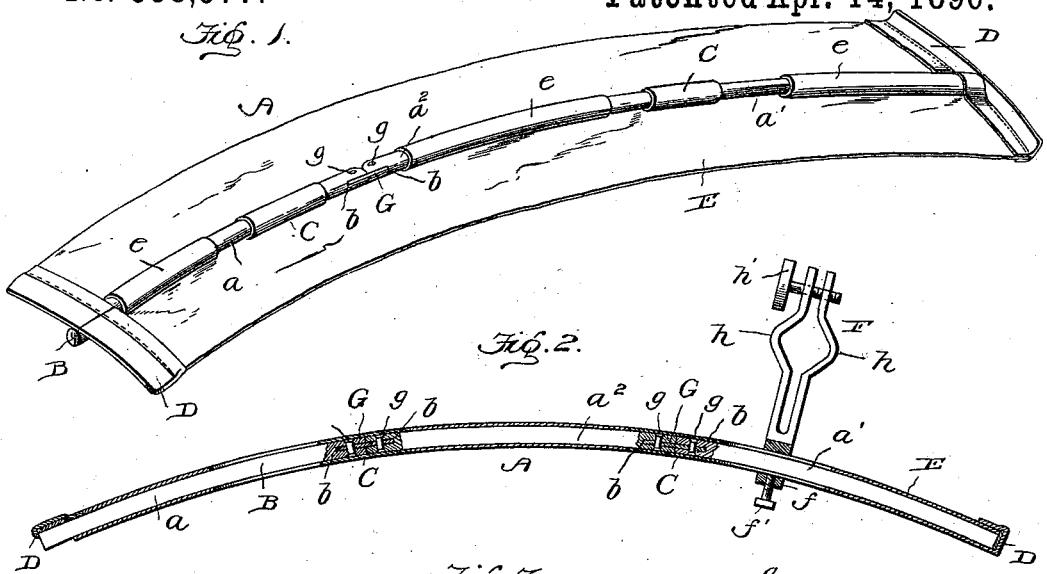
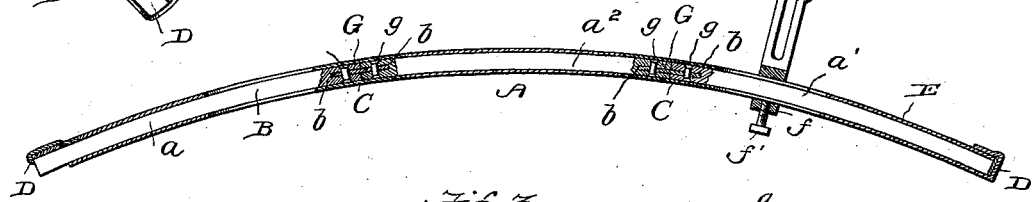
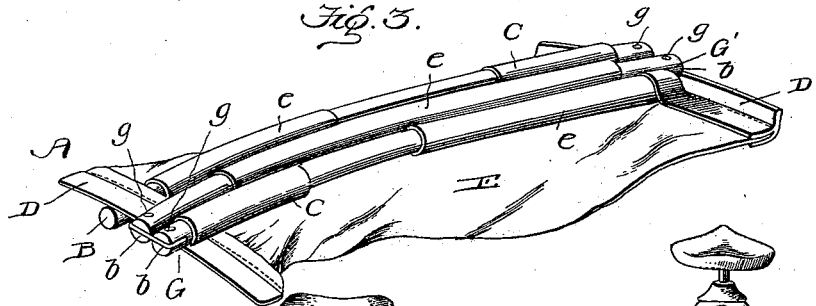
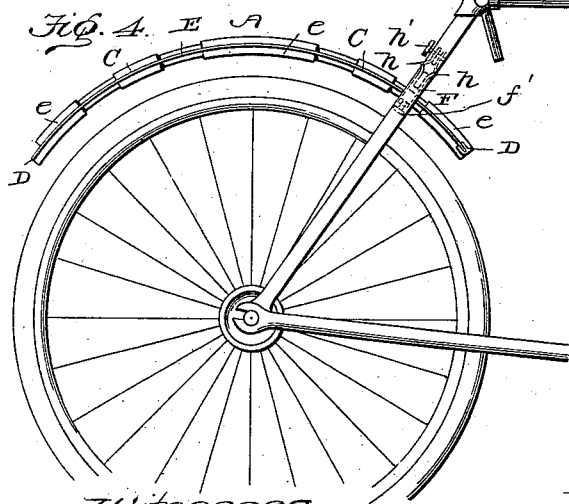
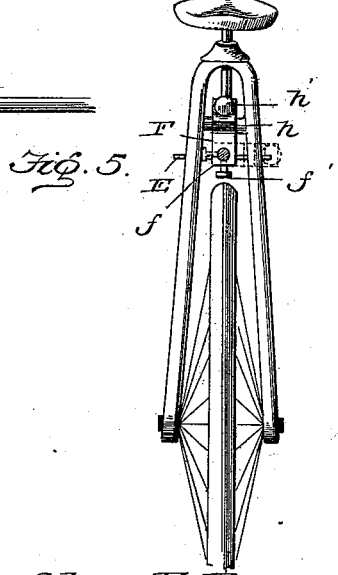
Witnesses
H. I. Bernhard
Adam F. Fox
Inventor
by Eden Brothers
Atty's

UNITED STATES PATENT OFFICE.

ADAM F. FOX, OF INDIANAPOLIS, INDIANA.

FOLDABLE MUD-GUARD.

SPECIFICATION forming part of Letters Patent No. 558,377, dated April 14, 1896.

Application filed August 27, 1895. Serial No. 560,674. (No model.)

*To all whom it may concern:*

Be it known that I, ADAM F. FOX, a citizen of the United States, residing at Indianapolis, in the county of Marion and State of Indiana, have invented certain new and useful Improvements in Foldable Mud-Guards; and I do hereby declare the following to be a full, clear, and exact description of the invention, such as will enable others skilled in the art to which it appertains to make and use the same.

My invention relates to a foldable mud-guard for use on bicycles and especially adapted for the ordinary safety-bicycles; and the object that I have in view is to provide a simple, inexpensive, and durable contrivance which may be folded within a very small compass, so as to be easily carried on the person, and which is so constructed that it may be quickly unfolded for use and attached to the frame of the bicycle.

With these ends in view my improved mud-guard consists of a longitudinal stretcher-bar, rod, or tube, made in sections of any desired number and having its members loosely connected together by link-joints which are pivotally attached to the members, a series of two or more slidable locking-tubes fitted to the members of the stretcher-bar and adapted to be adjusted over the link-joints so as to embrace the members and hold them rigidly in place, cross-heads on the ends of the stretcher-bar, and a suitable pliable shield attached to the cross-heads and adapted to be stretched and held taut when the sectional bar is held by the locking-tubes in a rigid condition and also adapted to fold up with the sectional bar into a small compass.

The invention also consists in the combination, with the foldable stretcher-bar, of a duplex attaching-clamp constructed to fit and be adjusted on the foldable bar, and also arranged to engage with the frame of a bicycle in order to hold the mud-guard in position thereon; and the invention further consists in the construction and combination of parts which will be hereinafter fully described and claimed.

To enable others to understand my invention, I have illustrated the same in the accompanying drawings, forming a part of this specification, and in which—

Figure 1 is a perspective view showing the mud-guard unfolded and adjusted for use, and Fig. 2 is a longitudinal sectional view through the mud-guard. Fig. 3 is a perspective view of the guard folded together for convenience in carrying the same. Fig. 4 represents, in side elevation, the guard applied to a bicycle, and Fig. 5 is a rear elevation of the parts shown by Fig. 4.

Referring to the drawings, in which like letters of reference denote corresponding parts in all the figures, A designates my foldable mud-guard, which consists of the sectional-jointed stretcher bar, rod, or tube B, the sleeves C C, the cross-heads D D, the pliable shield E, and the duplex clamp F.

The stretcher B may be made from a bar, rod, or tube of metal in three or more parts, which I have designated by the letters $a\, a'\, a^2$, and the adjacent ends of these members are slotted or notched, as at $b$, to receive the ends of the short links G G', said links being fitted snugly in the slotted ends of the members, and said links and members being pivotally connected together by means of the pins $g\, g$, which are passed through the members and links to have their ends headed or riveted down upon the members $a\, a'\, a^2$. These links enable the members $a\, a'\, a^2$ of the stretcher B to fold compactly one upon another.

The sleeves C C are fitted snugly on the members $a\, a'$ of the stretcher B, and they are adapted to be moved across or over the joints between the three members when the stretcher is unfolded or straightened, in order that one tube C may embrace the adjacent ends of the members $a\, a'$, and the other tube C may embrace the adjacent ends of the members $a'\, a^2$, whereby the tubes C C operate to hold the several members of the stretcher rigidly in alinement with each other, to enable the guard to be used.

The cross-heads D D are flat metallic pieces arranged at right angles to the stretcher B and rigidly attached in any suitable way to the free ends of the members $a\, a^2$ of said stretcher. These cross-heads are attached at their middle portions to the ends of the stretcher members, so that they project beyond both sides of the stretcher-bar or tube B, and the ends of the shield, presently described, are attached to these cross-heads in any suitable way. This shield E may be made of canvas, textile fabric, leather, rubber, or any other material, and the ends of said shield are attached in a suitable durable manner to the cross-heads D. The shield is preferably on the under lower side of the stretcher to protect the sectional stretcher from mud, &c.; but the shield may be placed above the stretcher, if desired. The shield is, or may be, provided with loops $e$ at intermediate points between its ends, and these loops are fitted around the members of the stretcher-bar in a manner to avoid interference with the adjustment of the slidable locking-sleeves C on said bar B.

The clamp F is formed at one end with an eye or loop $f$ for the purpose of fitting it on one member of the stretcher, so as to turn or slide on said stretcher, and this end of the clamp has a binding-screw $f'$, that can be adjusted to bind against the stretcher and thus hold the stretcher and clamp F rigidly together. The opposite end of the clamp is divided and formed with the jaws $h\,h$, which are coupled together by means of the draw-bolt or screw $h'$, the latter being passed through a slot or opening in one jaw $h$ and working in a threaded aperture tapped in the other jaw $h$ of said clamp.

To use the mud-guard, the stretcher bar or tube B is unfolded or straightened, so that the members $a\,a'\,a^2$ are substantially in line or assume the bowed form shown by the drawings, and the sleeves C are then adjusted, in the manner described, across the pivotal jointed ends of the stretcher to make each sleeve inclose one link G or G' and embrace the adjacent ends of two members of the stretcher. The stretcher is thus made to present the appearance of a stiff continuous bar or tube, and it holds the shield E in a taut stretched condition. The guard is now placed over the wheel of the bicycle, preferably between the diverging members of the rear part of the machine-frame, as shown by Figs. 4 and 5, and the stretcher is rigidly attached to and held in position on the bicycle-frame by the clamp F. This clamp may be placed in an upright position, as shown by full lines in Fig. 5, so that its jaw $h$ may embrace the short horizontal brace between the diverging rear members of the bicycle-frame, or said clamp may be turned to the horizontal position indicated by dotted lines in Fig. 5, to enable the jaws $h$ of said clamp to clasp one of the diverging members of the bicycle-frame. The stretcher and clamp are rigidly fastened together by the binding-screw $f'$, while the draw-bolt $h'$ provides the means whereby the jaws $h$ of the clamp are caused to firmly embrace the bicycle-frame to hold the clamp and mud-guard in place.

To detach the mud-guard, it is only necessary to release the draw-bolt $h'$ and take the clamp F off the machine. To fold the guard, the sleeves C are moved back from the joints upon the members $a\,a'$ and the stretcher and shield may now be folded compactly together, as indicated by Fig. 3.

Having thus fully described my invention, what I claim as new, and desire to secure by Letters Patent, is—

1. A foldable mud-guard for bicycles consisting of the two cross-heads, a single-jointed foldable rod fastened to said cross-head and provided with locking means for holding the sections in rigid relation to each other, and the pliable shield attached at its ends to the cross-heads and stretched thereby when the sectional rod is extended and locked, substantially as and for the purposes described.

2. A foldable mud-guard for bicycles comprising the two cross-heads, a single longitudinal rod attached at its ends to the cross-heads and having its members jointed together by links which are pivotally attached to said members, the slidable locking-sleeves fitted on said rod and adjustable thereon to embrace the link-joints and hold the members in rigid relation to one another when the stretcher is unfolded, and the pliable shield attached at its ends to the cross-heads and adapted to be stretched thereby when the sectional rod is extended and locked by the sleeves, substantially as and for the purposes described.

3. A foldable mud-guard for bicycles comprising the two cross-heads D, a single longitudinal sectional rod attached at its ends to the cross-heads and having its members joined by the links G, G', the locking-sleeves C, C, fitted on the rod and slidable thereon to embrace the joints between the members of said rod; and the pliable shield E attached at its ends to the cross-heads D and provided with loops $e$ which are fitted on the rod at points to avoid interferences with the adjustment of the locking-sleeves C, substantially as and for the purposes described.

4. The combination with the stretcher rod or bar B of a mud-guard, of the clamp F having an eye at one end to receive the bar or rod B and provided, at its free end, with the jaws $h$, the binding-screw in the eye-formed end of the clamp and adjustable to bind against the bar or rod B, and a draw-bolt $h'$ connecting the jaws $h$; said clamp F being movable longitudinally on the stretcher bar or rod, to sustain the mud-guard in the required position over a bicycle-wheel, and also adjustable to either an upright or substantially horizontal position for attachment to either the horizontal or upright bars of a bicycle-frame, as set forth.

In testimony whereof I affix my signature in presence of two witnesses.

ADAM F. FOX.

Witnesses:
H. B. WHITE,
F. C. GARDNER.